(12) United States Patent
Merrill et al.

(10) Patent No.: US 6,181,351 B1
(45) Date of Patent: Jan. 30, 2001

(54) SYNCHRONIZING THE MOVEABLE MOUTHS OF ANIMATED CHARACTERS WITH RECORDED SPEECH

(75) Inventors: John Wickens Lamb Merrill, Redmond; Tandy W. Trower, II, Woodinville; Mark Jeffrey Weinberg, Carnation, all of WA (US)

(73) Assignee: Microsoft Corporation, Redmond, WA (US)

(*) Notice: Under 35 U.S.C. 154(b), the term of this patent shall be extended for 0 days.

(21) Appl. No.: 09/059,681

(22) Filed: Apr. 13, 1998

(51) Int. Cl.$^7$ .................................................. G06F 15/00
(52) U.S. Cl. .................................................. 345/473
(58) Field of Search .................................. 345/435, 473, 345/474; 434/112, 118, 156, 167, 169, 185

(56) References Cited

U.S. PATENT DOCUMENTS

| | | | |
|---|---|---|---|
| 4,884,972 | 12/1989 | Gasper | 434/185 |
| 5,111,409 | 5/1992 | Gasper et al. | 395/152 |
| 5,277,997 | 1/1994 | Wilden et al. | 273/434 |
| 5,278,943 | 1/1994 | Gasper et al. | 395/2 |
| 5,287,446 | 2/1994 | William et al. | 395/152 |
| 5,425,139 | 6/1995 | Williams et al. | 395/152 |
| 5,430,835 | 7/1995 | Williams et al. | 395/154 |
| 5,613,056 | 3/1997 | Gasper et al. | 395/173 |
| 5,630,017 | 5/1997 | Gasper et al. | 395/285 |
| 5,680,531 | * 10/1997 | Litwinowicz et al. | 345/473 |
| 6,022,222 | * 2/2000 | Guinan | 345/473 |
| 6,088,040 | * 7/2000 | Oda et al. | 345/473 |

OTHER PUBLICATIONS

Syrdal, A. et al., *Applied Speech Technology*, Speech: Articulatory, Linguistic, Acoustic, and Perceptual Descriptions, Chapter 1, Section 5, pp. 15–22 (1995), Wellesley, Massachusetts.

Parke & Waters, *Computer Facial Animation*, Speech Synchronized Animation, Chapter 8, pp. 259–285 (1996), Boca Raton, Florida.

\* cited by examiner

*Primary Examiner*—Phu K. Nguyen
(74) *Attorney, Agent, or Firm*—Klarquist Sparkman Campbell Leigh & Whinston, LLP

(57) ABSTRACT

The animation of a speaking character is synchronized with recorded speech by creating and playing a linguistically enhanced sound file. A sound editing tool employs a speech recognition engine to create the linguistically enhanced sound file from recorded speech and a text of the speech. The speech recognition engine provides timing information related to word breaks and phonemes that is used by the sound editing tool to annotate the speech sound data when creating the linguistically enhanced sound file. When the linguistically enhanced sound file is played to produce sound output, the timing information is retrieved to control the animated character's mouth movement and word pacing in the character's word balloon. The sound editing tool additionally provides editing functions for manipulating the timing information. A text to speech engine can use the same programming interface as the linguistically enhanced sound file player to send notifications to the animation, providing prototyping without recorded speech. Since both use the same interface, recorded speech can be incorporated at a later time with minimal modifications.

30 Claims, 9 Drawing Sheets

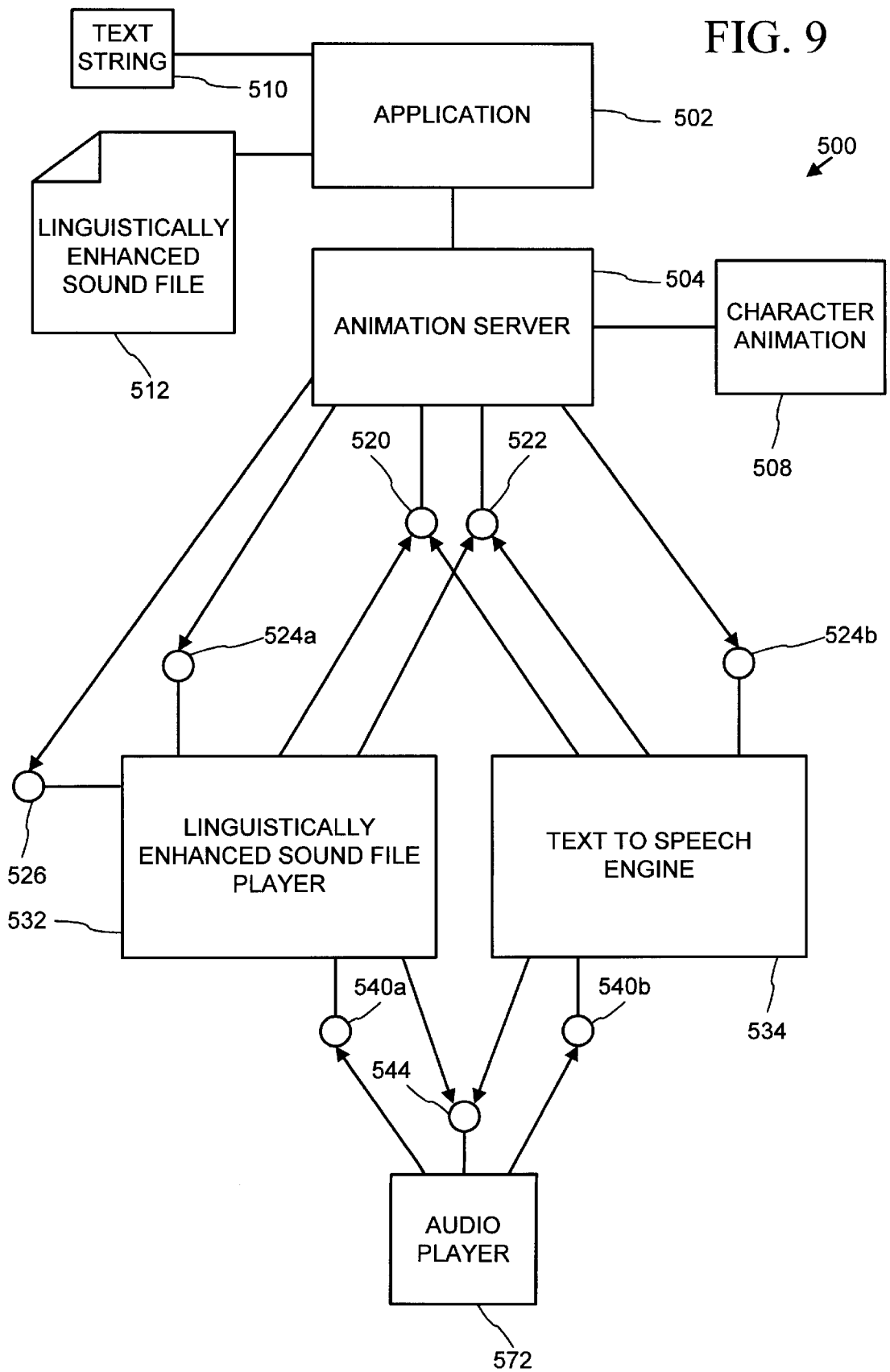

SYNCHRONIZING THE MOVEABLE MOUTHS OF ANIMATED CHARACTERS WITH RECORDED SPEECH

FIELD OF THE INVENTION

The invention generally relates to computer-generated animation, and more specifically to synchronizing animation with recorded speech.

BACKGROUND AND SUMMARY OF THE INVENTION

Computer animation has come into widespread use for a variety of applications. One such application is character animation. For example, a game program may present an animated character for entertainment, or an educational program may include an animated teacher character. In addition, animated characters are a useful part of social interfaces that present an interactive interface with human qualities. For instance, an animated character may appear on a computer display to help a user having difficulty completing a function or to answer questions. The character's creators may give it certain human traits reflected in gestures and other behavior, and the character may be programmed to react to actions by the user.

A challenge facing computer animators is presenting a convincing animation. One element of this challenge involves presenting a speaking character. Sound output for the character can be sent to a sound device such as a computer speaker. In the character animation, some activity is performed, such as having the character's mouth move or displaying the text of the spoken words in an accompanying word balloon, such as that shown in a newspaper comic strip. The appearance of words in the balloon can be paced to provide a closed-captioning effect. In this way, the user is presented with the illusion that the character on the display is actually speaking the words sounded from the computer speaker.

However, to create a compelling simulation of a speaking character, the character's mouth should be synchronized with the audio output. Part of the human communication experience includes receiving visual cues from whoever is speaking. If a character's mouth movement does not match the spoken words, the user will not experience a realistic presentation of the character. Instead, the animation is much like a foreign film in which the spoken translation is dubbed over the original sound track. In addition, if the appearance of the words in the character's word balloon is not properly paced with the character's speech, the resulting presentation can be confusing. Poor quality animation reduces the effectiveness of the character presentation. This can be especially troublesome if the character is being used as part of a social interface that is based on presenting a convincing simulation of an interactive speaking character. A social interface can be a useful tool for placing the computer user at ease and for assisting the user with unfamiliar tasks. However, a confusing character presentation defeats the purpose of a social interface.

When animation is done without a computer, synchronization is accomplished by an animator who draws each frame of the animated character to reflect an appropriate mouth shape. Inappropriate frames in an animation are usually perceptible by the viewer and result in an inferior animation. Therefore, the animator is typically a highly skilled professional who is highly compensated for high quality work. In addition, the process can be time consuming, as the animator often reviews the animation a small portion at a time to craft appropriate mouth shapes in each animation frame.

With the advent of computer animation systems, various tools have become available to professional animators to assist in the animation process. However, even with the aid of a computer, the professional animator still reviews and edits the animation a small portion at a time to ensure an appropriate mouth shape reflects what is being spoken in the recorded speech. Although the computer can provide some useful features, a great deal of work is still required by the animator, adding considerably to development costs. Further, computer software typically undergoes multiple revisions during its life cycle. Repeatedly involving the professional animator in each revision can become prohibitively expensive.

To avoid the expenses related to the labor-intensive task of the animator, some software developers have addressed the problem of mouth synchronization by using the amplitude of the accompanying recorded speech to control mouth movement. Throughout the animation, the size of the character's mouth opening is adjusted to match the amplitude of the speech sounded from the computer's speaker. However, this approach has the drawback of inaccurately depicting the character's mouth in many instances. For example, the amplitude of an aspirated sound such as the "h" in "hello" is typically very low. Accordingly, based on amplitude, a closed mouth might be displayed when the "h" sound is voiced. However, the human mouth must be open in order to pronounce the "h" sound. Similar problems exist for other sounds. As a result, this approach has not led to high quality presentations of animated characters.

Another approach to solving the synchronization problem is to use a synthetic voice generated by a text to speech ("TTS") software engine to generate the speech sound for the character animation. A text to speech engine can output a synthetic voice based on a text string. For instance, if supplied with the text "hello," the TTS engine will produce a voice speaking the word "hello." As the TTS engine generates output, a system can select appropriate mouth shapes for use in the animation. The result is animation in which the character's mouth movement is synchronized with the synthetic voice. However, due to various limitations associated with synthetic voices, the sound output does not result in a voice that is of the quality available from human professional vocal talent. Thus, the TTS approach does not result in high quality animated speaking characters. In addition, one of the features of a social interface is to put the user at ease by presenting human characteristics in the animated character. Typically, the user perceives that a synthetic voice is that of a machine lacking familiar human characteristics. As a result, the TTS approach fails to offer the convincing presentation needed for a social interface.

The invention provides a method and system for synchronizing computer output or processing with recorded speech. The invention is particularly suited to synchronizing the animation of a character with recorded speech while avoiding the problems described above. Although the synchronization can be performed without a professional animator, the resulting animation is of the high quality necessary for a compelling presentation of a speaking character. The invention can also be used to synchronize other computer output with recorded speech. For example, a background color or background scene can be changed based on an event in the recorded speech.

In one implementation, a system synchronizes the animation of a character with recorded speech in the form of speech sound data. The system includes a sound file tool, a speech recognition engine, and a file player. The sound file tool acquires the speech sound data and a text of the speech sound data. The speech recognition engine analyzes the speech sound data and the text to determine linguistic event values and time values. A linguistic event value indicates a linguistic event in the speech sound data, such as a spoken phoneme, a spoken word, or some other event. A time value indicates when the linguistic event occurs within the speech sound data. The sound file tool annotates the speech sound data with these values to create a linguistically enhanced sound file.

When the character is animated, the file player plays the linguistically enhanced sound file to produce sound output and send information to the animation. The information includes events specifying that the animation perform some action to indicate the linguistic event at a time indicated by the time value. For example, a particular mouth shape associated with a spoken phoneme could be presented in a frame of the character animation or the text of a spoken word could be presented in the character's word balloon. The result is a synchronized animation of a quality superior to that produced by amplitude-based mouth shape selection.

In addition, since a human voice is used, the quality of the sound output is superior to that produced by a TTS-based synthetic voice, and the invention provides a compelling illusion of a speaking character. Since the process of acquiring linguistic information such as phoneme and word break data is automated, the process can be performed by a user who is unfamiliar with the art of animation.

Another aspect of the invention is a system for editing the linguistic event values and time values. This system is implemented in a sound editing tool that provides a user interface displaying a graphical representation of a sound wave representing recorded speech. The tool enables the user to edit the timing information to improve performance. Thus, the invention might also be useful to a professional animator. In a further aspect of the invention, the linguistic information and sound data can be combined into a single enhanced sound file, providing ease of distribution and use. In addition, the file can be constructed so that it can be played with a player capable of playing the original sound data, providing compatibility.

In another aspect of the invention, programming interfaces in the system are arranged to reduce the costs of prototyping. The enhanced sound file player is arranged so that it has an interface to the animation controller that is compatible with the interface of a TTS-based animation system. In this way, the character's actions and speech can be prototyped using the inexpensive TTS option, supplying plain text instead of a recorded human voice. The TTS engine generates a synthetic voice and provides data for synchronizing the character's mouth. The synthetic voice is often acceptable for prototyping purposes. When the development is in the final phases, an enhanced sound file can be generated with professional vocal talent. The enhanced sound file can be easily integrated into the character because the TTS engine and the enhanced sound file player use compatible interfaces. In this way, professional vocal talent need not be employed throughout the entire development process, reducing development costs.

Further features and advantages of the invention will become apparent with reference to the following detailed description of illustrated embodiments that proceeds with reference to the accompanying drawings.

BRIEF DESCRIPTION OF THE DRAWINGS

FIG. 9 is a block diagram showing a linguistically enhanced sound file player and a text to speech engine using compatible interfaces to an animation server and an audio player.

DETAILED DESCRIPTION

The invention is directed to methods and systems for synchronizing the animation of a speaking character with recorded speech. In the illustrated embodiments, the invention is illustrated as implemented in a software suite entitled "Microsoft Agent," marketed by Microsoft Corporation of Redmond, Washington. Microsoft Agent provides a wide variety of features for manipulating animated characters, including an animation server. Microsoft Agent uses various components of Microsoft Command and Control speech recognition engine, also marketed by Microsoft Corporation. Microsoft Command and Control speech engine includes a general-purpose speech recognition engine. A software utility available from Microsoft Corporation entitled "Microsoft Linguistic Information Sound Editing Tool" provides features for manipulating sound files and linguistic data for use with Microsoft Agent or another animation server.

Exemplary Operating Environment

Figure 1:
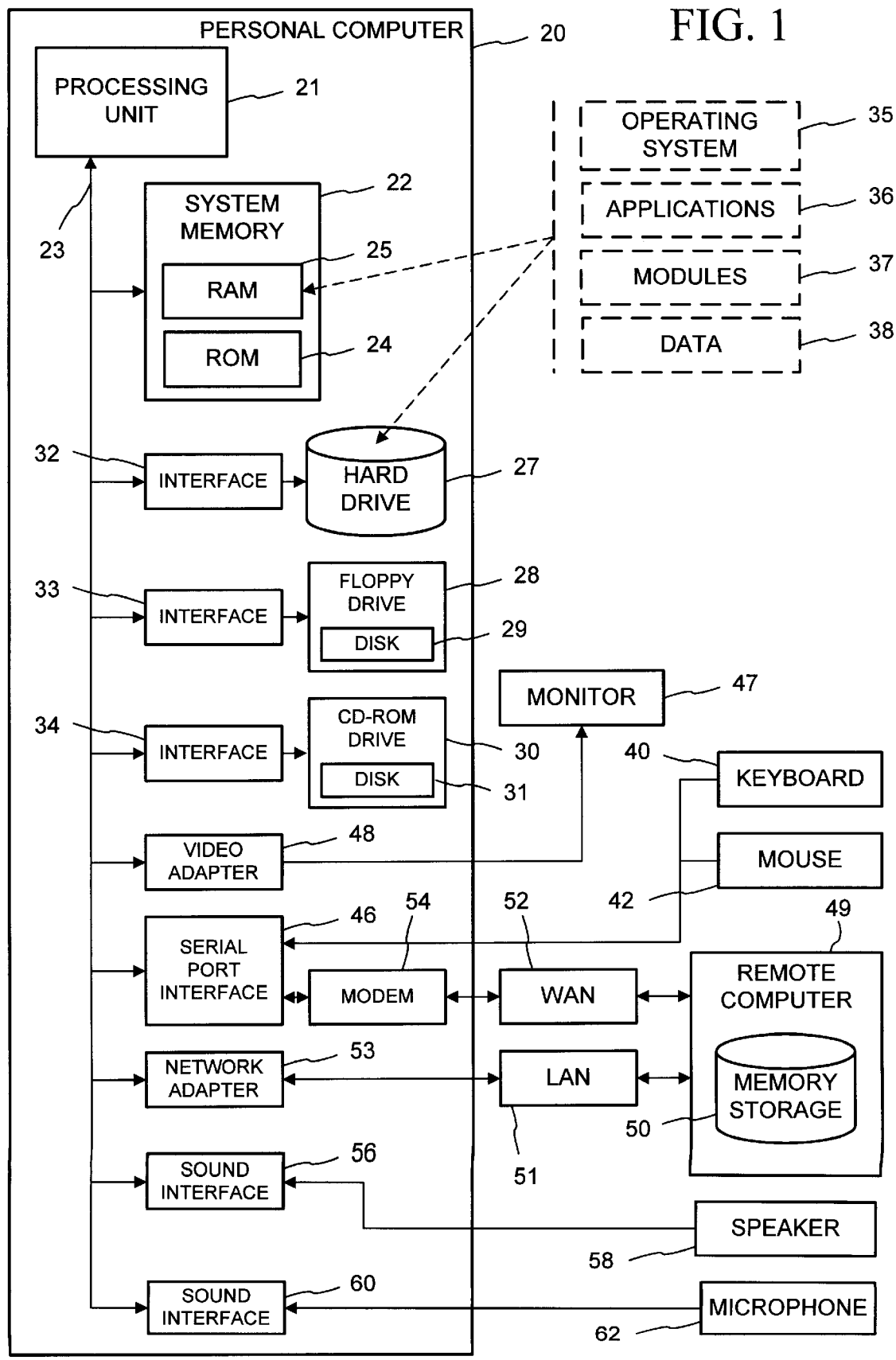
FIG. 1 is a block diagram of a computer system that may be used as an operating environment for the invention.

FIG. 1 and the following discussion are intended to provide a brief, general description of a suitable computing environment in which the invention may be implemented. The invention is implemented in a variety of program modules. Generally, program modules include routines, programs, components, data structures, etc. that perform particular tasks or implement particular abstract data types. The invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples various system components including the system memory to the processing unit 21. The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the personal computer 20. Although the description of computer-readable media above refers to a hard disk, a removable magnetic disk and a CD, other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. A microphone 62 is connected to the system bus 23 by an interface such as a sound interface 60 for sound input. Sound input can be acquired from other sound-producing devices, such as a cassette tape player, an audio CD, or some transducer. The sound interface 60 may be implemented in any number of ways such as an interface card, part of a chipset associated with the processing unit 21, or some software driver for receiving sound from the microphone 62. A user may enter commands and information into the personal computer 20 through a keyboard 40 and pointing device, such as a mouse 42. Other input devices (not shown) may include a joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. A speaker 58 is connected to the system bus 23 via an interface such as a sound interface 56 for sound output. Sound output can be generated by some other sound generating device such as headphones or some transducer. The sound interface 56 may be implemented in any number of ways such as an interface card, part of a chipset associated with the processing unit 21, or a software driver for controlling the speaker 58. Alternatively, the sound interface 56 and the sound interface 60 may be combined into a single interface. In addition to the monitor, personal computers typically include other peripheral output devices (not shown), such as printers and telephone controllers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. The network connections shown are exemplary and other means of establishing a communications link between the computers may be used.

Overview of an Illustrated Embodiment

Figure 2:
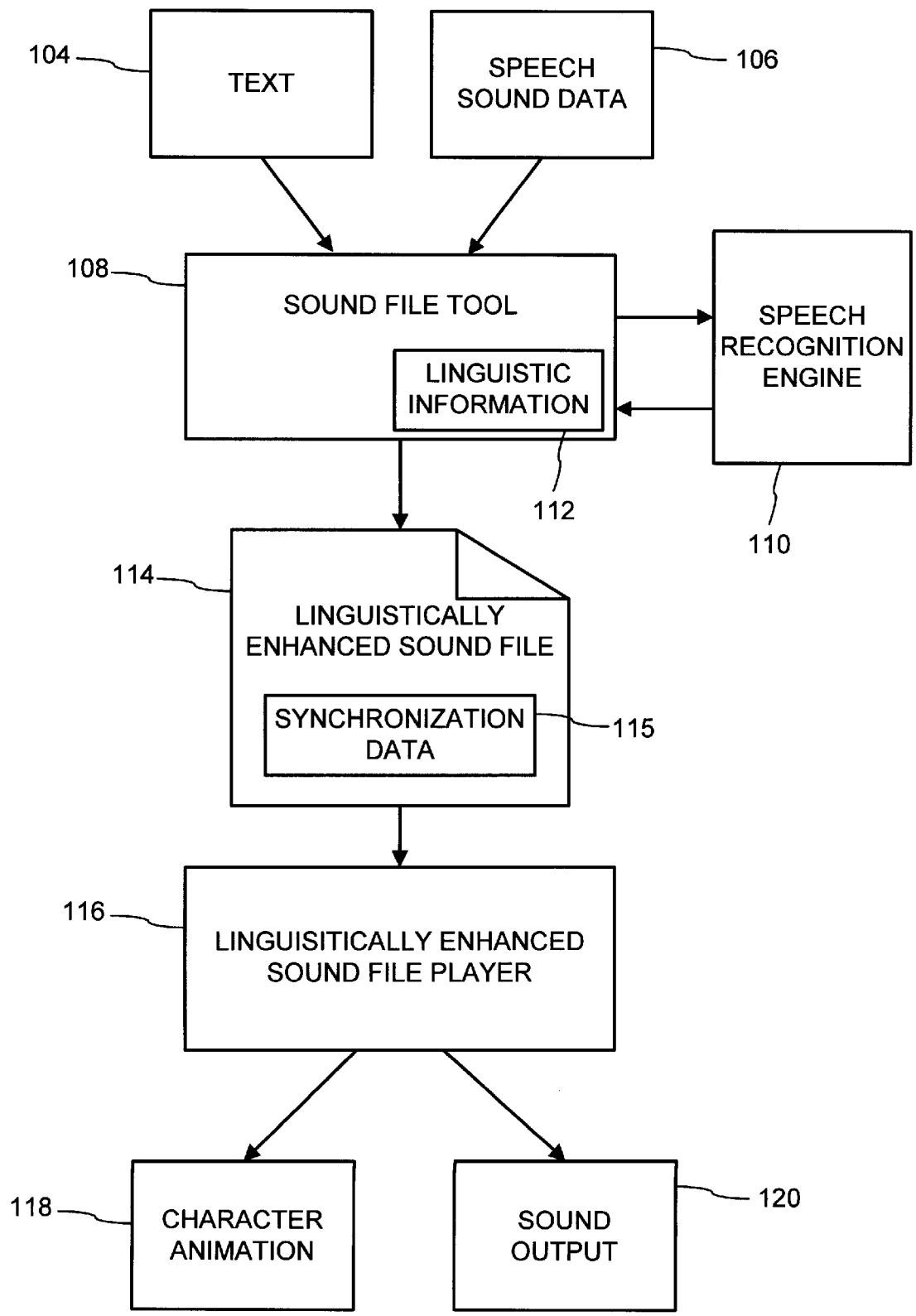
FIG. 2 is a block diagram of a system for creating and playing a linguistically enhanced sound file, including a sound file tool and a linguistically enhanced sound file player that execute on a computer system such as shown in FIG. 1.
Figure 3:
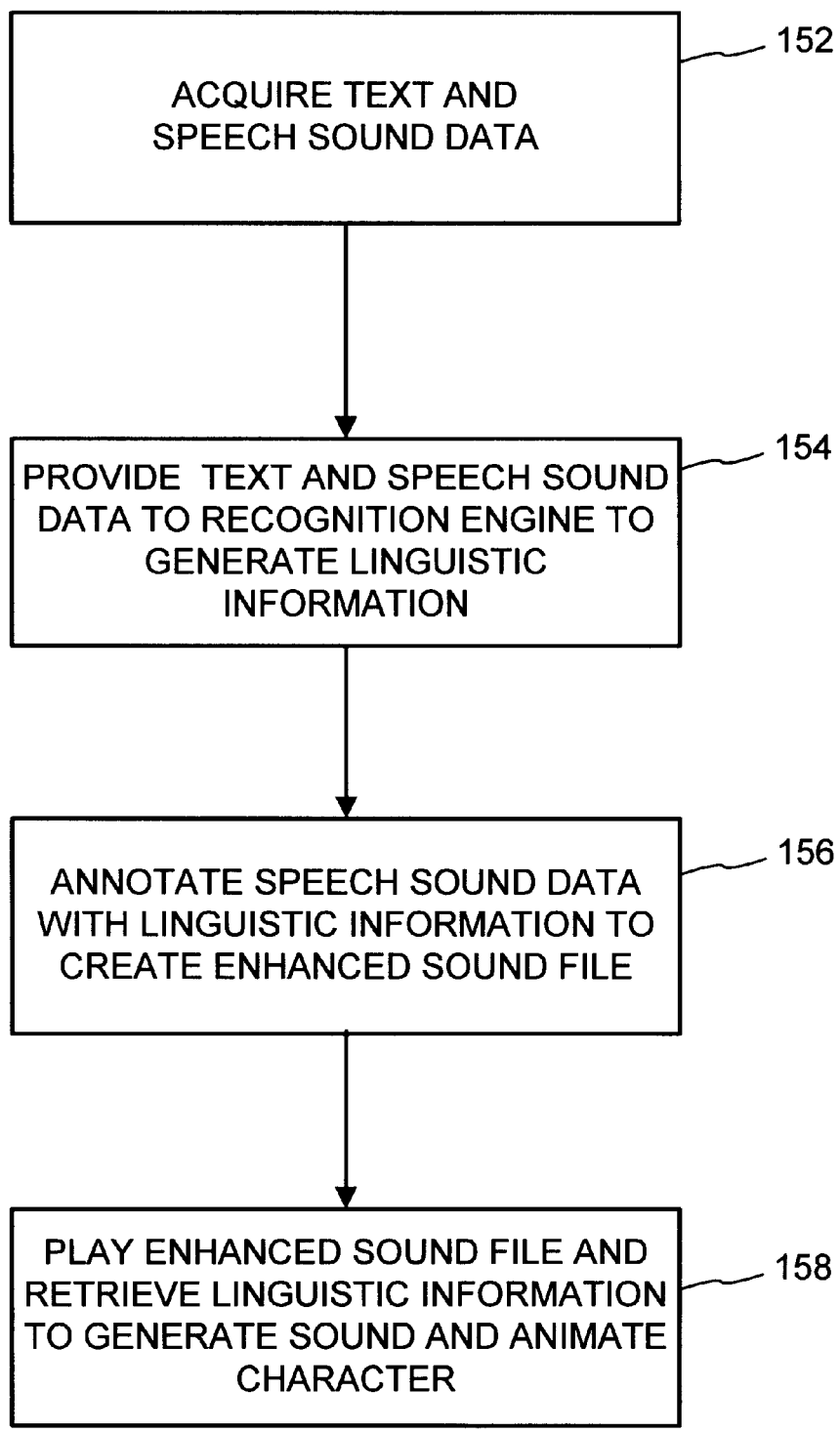
FIG. 3 is a flowchart of a method performed by the system of FIG. 2.

FIGS. 2 and 3 provide an overview of a system for creating and using a linguistically enhanced sound file to synchronize computer output with recorded speech. This system includes two primary components: 1) a sound file tool and 2) an enhanced sound file player. The linguistically enhanced sound file is particularly suited for synchronizing recorded speech with animation but may have other applications such as synchronizing a slide show presentation with an accompanying narrative. FIG. 3 is a flowchart showing the operation of the system shown in the block diagram of FIG. 2.

In FIGS. 2 and 3, a character animation is synchronized with speech sound data. In general terms, a sound file tool 108 acquires a text string 104 and a speech sound data stream 106 to create a linguistically enhanced sound file 114. A linguistically enhanced sound file player 116 then plays the sound file 114 to present a speech sound data stream 106 through a sound output device 120 and synchronize a character animation 118 accordingly.

The sound file tool 108 acquires the text string 104 and the speech sound data stream 106 at step 152 (FIG. 3). The text string 104 is a textual version of what is spoken in the speech sound data stream 106. For example, the text string 104 might be an ASCII text string and the speech sound data stream 106 might be a sound file produced by digitally sampling (e.g., with a microphone) a person speaking the words of the text string 104.

The sound file tool 108 provides the text string 104 and the speech sound data stream 106 to a speech recognition engine 110 at step 154 (FIG. 3) to produce the linguistic event information data structure 112. The sound file tool 108 may offer other features as described below. The speech recognition engine 110 is software that can recognize spoken items in a sound data source. In the illustrated embodiment, the text string 104 is provided to the speech recognition engine 110 in the form of a grammar, described in more detail below. The linguistic information data structure 112 provided by the speech recognition engine 110 is information concerning the speech sound data stream 106, such as what phonemes, words, or other sounds are in the speech sound data stream 106 and when they occur in the speech sound data stream 106. For example, the linguistic information data structure 112 could contain a phoneme list, each element in the list indicating a phoneme value and when the phoneme occurs within the speech sound data stream 106 (e.g., using number of bytes or milliseconds to measure time).

At step 156 (FIG. 3), the sound file tool 108 annotates the speech sound data stream 106 with the linguistic information data structure 112 to create the linguistically enhanced sound file 114 comprising a synchronization data chunk 115. Alternatively, the synchronization data chunk 115 could be scattered throughout the sound file 114. At step 158, the linguistically enhanced sound file player 116 plays the sound file 114 to present sound output to the sound output device 120 and uses the synchronization data chunk 115 in the sound file 114 to synchronize the character animation 118 with the sound output device 120. Typically, the synchronization data chunk 115 includes a phoneme type (or a word) and a timing reference used to synchronize playback of the phoneme (or word) with the animation. The various components and steps are described in greater detail below.

The arrangement shown in FIGS. 2 and 3 could take other forms. For example, linguistically enhanced sound data could be created and played without placing it in a file. Also, FIG. 2 should not be interpreted to require the sound file tool 108 and the linguistically enhanced sound file player 116 to reside on the same computer, although this is a possible arrangement. A common arrangement is to create the linguistically enhanced sound file on a development computer, test the file using a player, and then distribute the file to computers with access to a player. Still other alternatives are possible as explained in the more detailed description below.

Creating and Playing a Linguistically Enhanced Sound File

In the following detailed description of implementations of the invention, a linguistically enhanced sound file is created from text and recorded speech to synchronize the animation of a character with the recorded speech. The detailed description describes a system using mouth animation and word balloon animation together, but each could be used separately. During the file creation process, a speech recognition engine detects the presence of phonemes (or words) within the recorded speech and provides its results through a programming interface. Once created, the file can be played to produce sound output and to send data to an animation server to synchronize the character animation with the sound output. Various details concerning phonemes, speech recognition engines, and programming interfaces are provided in the following description.

Using Phonemes in a Character Mouth Animation

Phonemes are the fundamental sounds that make up speech. For example, the word "that," when spoken, could be divided into a phoneme for "th," a phoneme for "a," and a phoneme for "t." Each phoneme is associated with a small number of mouth positions. Thus, one can produce a compelling illusion of a mouth moving to generate the sounds heard by synchronizing audio playback of a phoneme with display of a mouth shape corresponding to the phoneme. In large, high-quality animations, interpolation between different positions may be necessary to produce an accurate appearance of mouth shape, but for many animations, a small number of mouth shapes is sufficient. Those of skill in the art of linguistics are familiar with the international phonetic alphabet ("IPA"), a language-independent set of phonemes, each of which has a single articulatory posture. For example, in the IPA, the word "that" would be represented as "/ðæt/." Incorporating the IPA with the invention provides the benefits of a single alphabet for multiple languages and a single mouth shape for each phoneme.

In addition, it is not necessary to present a different mouth shape for each phoneme. The illustrated embodiments use a limited set of mouth shapes, employing a mapping function to associate a set of phonemes with a single mouth shape. Information about the mouth shape and when to present it is sent to the animation while simultaneously presenting speech sound output. The result is synchronized mouth animation.

Speech Application Programming Interface

In the illustrated embodiments of the invention, the system uses programming objects that support the Speech Application Programming Interface (SAPI) specification developed by Microsoft Corporation. SAPI is a publicly available standard for input and output components of speech-related applications.

In object-oriented programming languages, programming objects are used to represent various items associated with the software. Programming objects typically have associated member functions (i.e., software routines or methods) and properties (i.e., attribute values or state data). Rather than expose their properties directly, programming objects typically exhibit a characteristic called encapsulation, whereby the programming object allows manipulation of its properties only through a set of member functions called a programming interface. Interfaces can be arranged in a standard fashion so that the programming object can be used by a variety of software without regard to internal implementation details. When shown on a drawing, the programming interface is typically depicted as a plug-in jack to the object (e.g., see the programming interface 522 of FIG. 9).

A number of companies have created implementations of the SAPI interface. The purpose of SAPI is to provide speech services that application developers can incorporate into their programs by invoking functions in SAPI. Software that complies with the SAPI standard is said to be "SAPI-compliant." Although the illustrated embodiments use several SAPI-compliant components, the invention could be carried out using some other programming interface or without using an object-oriented programming environment.

Speech Recognition Engines

A speech recognition engine is a collection of software routines for analyzing speech sound data (commonly called an "utterance") to determine what words are spoken in the sound data. Speech recognition engines are based on a phonological decomposition of the words in the speech sound data. In other words, the engine breaks the speech sound data into smaller parts associated with particular sounds. Although some other method could be used, speech recognition engines typically divide the data into phonemes. For example, a speech recognition engine presented with speech sound data containing the spoken word "that" might divide the sound data into components for sounds related to phonemes for "th" "a," and "t."

The engine analyzes the resulting phonemes in conjunction with a grammar that is provided to the speech recognition engine in advance. The grammar specifies the set of possibilities available to the speech recognition engine. In simplest terms, the grammar tells the speech recognition engine what to look for. Typically, only items specified in the grammar are valid speech recognition engine responses. For example, a grammar may be defined as "Send mail to (Laura or Robert)." On a basic level, the speech recognition engine decomposes the speech sound data into discrete phonemes and tries to match the phonemes against the phonemes in "Send mail to Laura" or "Send mail to Robert." In practice, the problem of speech recognition involves many mathematical calculations, and different approaches have been used with varying degrees of success. Various commercial implementations of speech recognition engines are available, some of which support the SAPI standard.

The illustrated embodiments use for their speech recognition engine an implementation of Microsoft Command and Control speech recognition engine, available from Microsoft Corporation, but other engines complying with the Microsoft Speech Application Programming Interface (SAPI) could be substituted. Finally, the invention could be carried out with any engine that provides information for determining word break, phoneme, or other linguistic information associated with the speech sound data submitted to it.

Creating a Linguistically Enhanced Sound File

Figure 4:
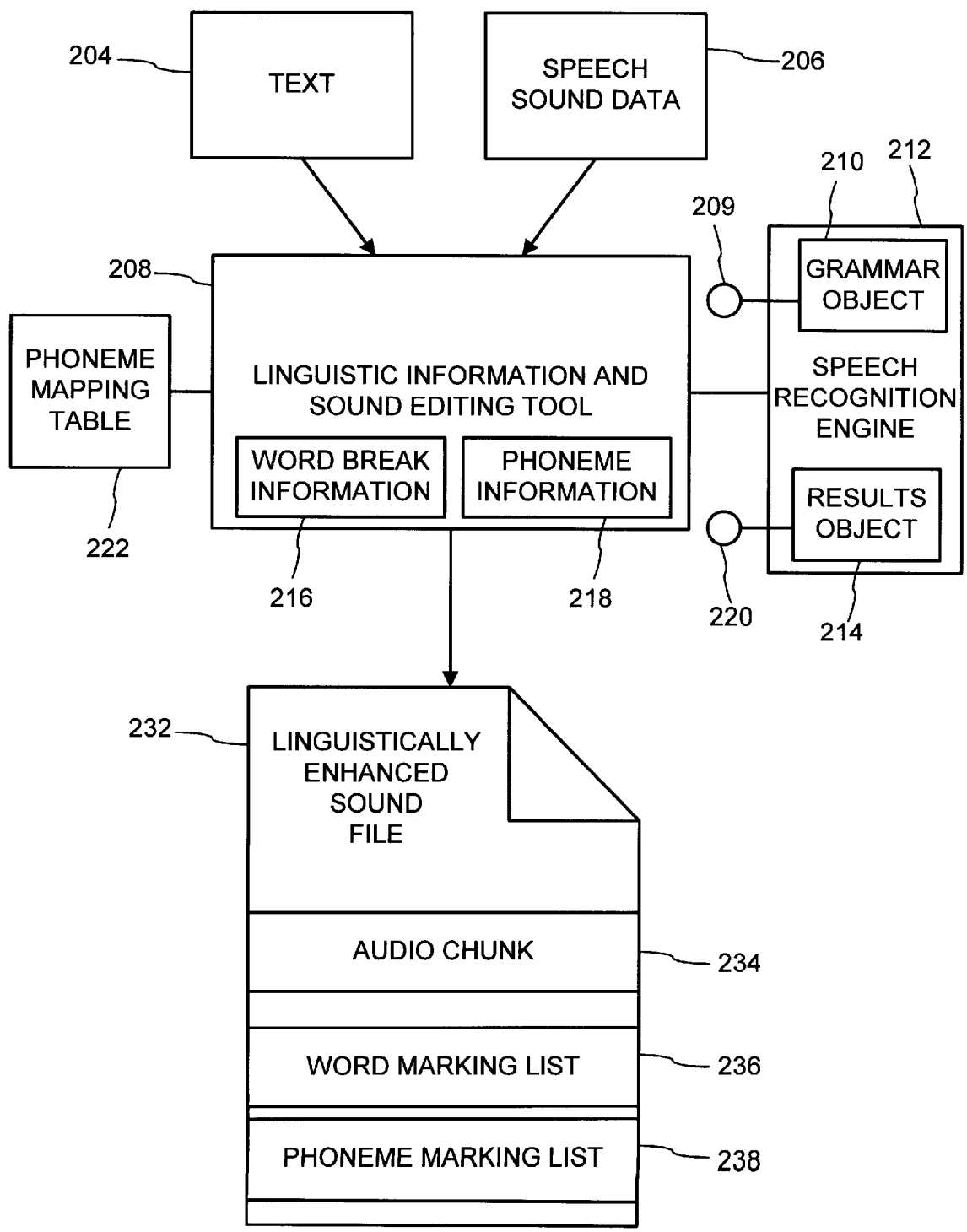
FIG. 4 is a block diagram of a linguistic information and sound editing tool that executes on a computer system shown in FIG. 1 and creates a linguistically enhanced sound file.
Figure 5:
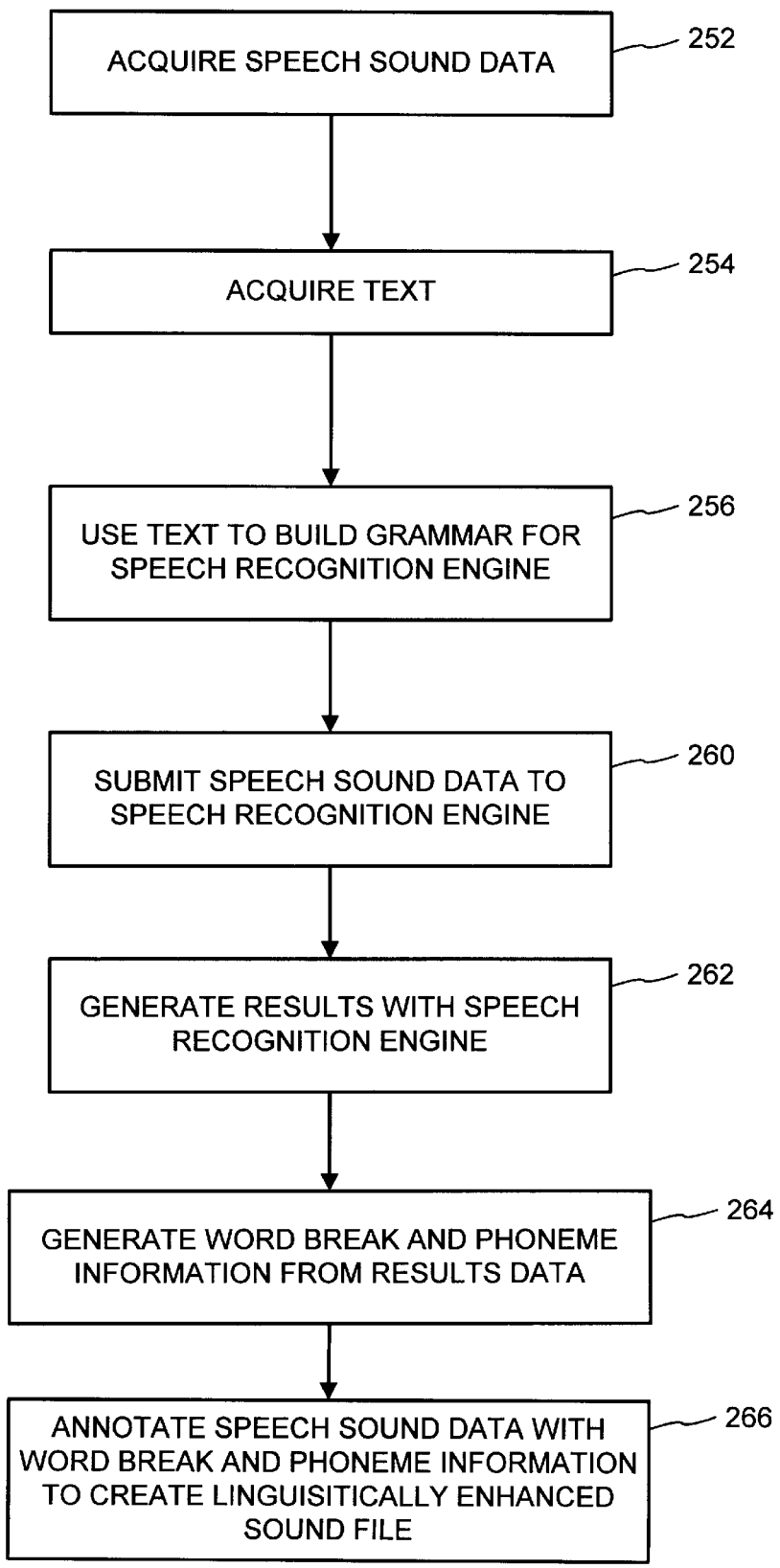
FIG. 5 is a flowchart of a method carried out by the editing tool of FIG. 4 for creating a linguistically enhanced sound file.

A system and method for creating a linguistically enhanced sound file are shown at FIGS. 4 and 5. On a basic level, a linguistic information and sound editing tool 208 creates a linguistically enhanced sound file 232 by annotating the speech sound data 206 with the results of an analysis performed by the speech recognition engine 212. At some later time, a player can play the linguistically enhanced sound file 232 to present the speech sound data 206 and also to send information about the speech sound data 206 to an animation. The result is an animation that is synchronized with the speech sound data 206.

The linguistic information and sound editing tool 208 acquires the speech sound data at step 252 (FIG. 5). In the illustrated embodiment, the speech sound data 206 is of the familiar WAV sound format (also known as RIFF format). The data 206 is acquired by opening a saved file or by sampling an input device such as the microphone 62 (FIG. 1) or some other sound input device. For example, the speech sound data 206 might be a sound file in WAV format representing a person speaking a sentence. Alternatively, the speech sound data 206 could be of the μ-law, AIFF, or some other format.

At step 254, the linguistic information and sound editing tool 208 acquires text 204. Text 204 is a textual representation of the speech sound data 206. In the illustrated embodiment, this is a character string in the familiar ASCII format, and a user types the string using the keyboard 40 (FIG. 1) or some other input device. Alternatively, text 204 could be of any number of formats, such as a Unicode string, or some other representation of text. In addition, text 204 could be stored in a file instead of typed by the user.

Next, the linguistic information and sound editing tool 208 provides to the speech recognition engine 212 a data structure containing a list of possibilities called a grammar. In basic terms, a grammar tells a speech recognition engine what to look for in sound data. A grammar typically conforms to some syntax for specifying alternatives, but in the illustrated embodiment, the grammar contains a single entry: a representation of text 204 in a form acceptable to the speech recognition engine 212.

At step 256, the linguistic information and sound editing tool 208 creates a grammar object 210 and adds to it an entry associated with text 204. In this way, the speech recognition engine 212 is instructed to look in the speech sound data 206 for phonemes and words associated with text 204. The entry is added using the SAPI interface ISRGramCFG 209 of the grammar object 210. Alternatively, the grammar could be in the form of an array, a linked list, or some other data structure, and information related to text 204 (e.g., text 204 itself) could be added to the data structure using some method other than the ISRGramCFG interface 209, such as by a call to a subroutine. Another possible alternative would be to use a different implementation of the grammar object 210. For example, instead of submitting text 204 to the speech recognition engine 212, an alternative implementation could depend on the speech recognition engine 212 to infer the text spoken from the speech sound data 206 alone, without need of text 204 in the first place. Such an implementation could forego the use of the ISRGramCFG interface 209, and use some other grammar interface or function without a grammar interface or a separate grammar object.

At step 260, the linguistic information and sound editing tool 208 submits the speech sound data 206 to the speech recognition engine 212, which performs its analysis and returns results to the linguistic information and sound editing tool 208. In the illustrated embodiment, the speech recognition engine 212 calls a software routine specified by the linguistic information and sound editing tool 208 when it completes its analysis. The tool 208 specifies the software routine by using a pointer and the ISRNotifySink programming interface. However, some other arrangement could be used to indicate that the analysis is completed, or the speech recognition engine 212 could be directly integrated into the linguistic information and sound editing tool 208.

At step 262, the speech recognition engine 212 generates the results object 214 by analyzing the speech sound data 206 and the grammar object 210. In FIG. 4, the results object 214 is a speech recognition results object that can be accessed using a programming interface 220 as described below. In addition to containing other information described below, the results object 214 specifies whether the speech recognition engine successfully performed its analysis. In some instances, repeated attempts may be necessary, especially if there is background noise in the speech sound data 206.

The linguistic information and sound editing tool 208 uses the timing information in the results provided by the speech recognition engine 212 to generate word break information 216 and phoneme information 218 at step 264. In FIG. 4, the results object 214 includes a data structure called a results graph that provides detailed information about what words and phonemes were spoken, when they were spoken, how loud they were, what their alternatives were (if any), and so on. If alternatives were specified in the grammar, the results graph indicates which of the alternatives were likely spoken by using a scoring method. In the grammar object 210 of FIG. 4, only one alternative was specified, so the results graph may specify only one alternative. Instead of using a results graph, the results object 214 could indicate the results in the form of an array or some other data structure.

The results graph specifies values indicating how many bytes from the beginning of the speech sound data 206 a phoneme or word begins and ends. These values can be used to determine when within the speech sound data 206 the phoneme type occurs. The linguistic information and sound editing tool 208 uses the ISRResGraph programming interface 220 to view the recognition results graph. The specification for the ISRResGraph interface 220 is as follows:

| Member function | ISRResGraph Description |
|---|---|
| BestPathPhoneme | Gets the specified phoneme path from the list of most likely phoneme paths provided by the speech-recognition engine for a recognition. |
| BestPathWord | Gets the specified word path from the list of most likely phoneme paths provided by the speech-recognition engine for a recognition. |
| GetPhonemeNode | Gets information about the phoneme for a given node in a recognition results graph. |
| GetWordNode | Gets information about the word for a given node in a recognition results graph. |
| PathScorePhoneme | Determines the score for a particular phoneme path. |
| PathScoreWord | Determines the score for a particular word path. |

When a phoneme-based speech recognition engine successfully matches speech sound data with a potential text, it generates a hypothetical phonetic alignment between the phonemes that the original speaker probably spoke and the sounds in the speech sound data. In the art of speech recognition, the speech sound data to be recognized is commonly called an utterance. The phonetic alignment typically divides the utterance into mutually disjoint intervals, where each interval identifies the portion of the utterance in which the speaker is producing each of the phonemes in the utterance in turn. For example, if the speaker said "that", then the engine would divide the utterance into three disjoint pieces, a "/ð/-piece", an "/æ/-piece" and a "/t/-piece", in that order, so that a practiced listener in the language would hear each of those sounds in turn if the pieces were sounded in turn.

In the process of generating this alignment, the engine also generates an alignment between the utterance and the words in its text. Thus, if the speaker uttered the words "that cat", the engine would generate a pair of disjoint intervals, the first of which would coincide with the portion of the utterance during which the speaker was saying "that" and the second of which would correspond to that portion of the utterance during which the speaker was saying "cat".

In the illustrated embodiment, the recognition hypothesis is stored in the results object 214. The ISRResGraph interface 220 captures the phoneme and word alignments from the results object 214 through the BestPathPhoneme and BestPathWord interfaces, respectively. As a side effect of the way typical recognition engines work, however, the engine frequently produces more than one hypothetical recognition during its analysis. As a result, these interfaces typically return a list of nodes for both phonemes and words corresponding to each recognition hypothesis. An application can iterate through the nodes in a recognition hypothesis using the GetPhonemeNode and GetWordNode methods on each node in a path in turn to generate the alignments for both words and phonemes.

Thus, appropriate member functions of the ISRResGraph programming interface 220 are employed to generate the word break information 216 and the phoneme information 218 from the speech recognition results object 214. The word break information 216 is a list of words and time values indicating when they occur within the speech sound data 206. The phoneme information 218 is a list of phoneme codes associated with the International Phonetic Alphabet and time values indicating when the phonemes occur in the speech sound data 206. The time values are represented by a start and stop offset indicating a number of bytes from the start of the speech sound data 206.

For example, the word break information 216 might contain a list of 10 words, the first of which being "Ha." The start and stop offsets would indicate the number of bytes from the beginning of the speech sound data 206 the word "Ha" started and stopped. Similarly, the phoneme information 218 might contain a list of 50 phonemes, the first of which is a code indicating the "hh" member of the International Phonetic Alphabet. Alternatively, the information could be stored in other ways, or this step might be unnecessary if the speech recognition engine 212 provides the results of its analysis in a preformatted fashion.

In the illustrated embodiment, a byte of the speech sound data represents a particular amount of time. Therefore, an offset indicating a number of bytes from the start of the speech sound data 206 corresponds to a particular amount of time that has elapsed from the beginning of the sound. In some other implementation (e.g., one using a compressed format), the time values may be implemented as a unit of time (e.g., milliseconds) or as a pointer to a particular location in the speech sound data 206.

The linguistic information and sound editing tool 208 obtains word break and phoneme information from the speech recognition engine 212. However, information about other linguistic events could be obtained in alternative embodiments, such as a change in volume, a change in pitch, singing, or nonverbal events such as coughing or sneezing. These linguistic events are used to synchronize some action in the animation. For example, if a rise in pitch at the end of a sentence is detected, the animation performs some action indicating that a question was asked (e.g., displaying a question mark or performing some gesture in the animation). If a cough is detected, the animation presents an animated character that coughs at the appropriate time.

At step 266, the speech sound data 206 is annotated with the word break information 216 and the phoneme information 218 to create a linguistically enhanced sound file 232. In the illustrated embodiment, the linguistic information and sound editing tool 208 combines the speech sound data 206, the word break information 216, and the phoneme information 218 into a single file 232 containing an audio chunk 234, a word marking list 236, and a phoneme marking list 238. The audio chunk is a part of the file 232 (e.g., a set of bytes) containing audio data. Typically, the audio chunk 234 is of the same format (e.g., WAV) as the speech sound data 206, but can be of some other format. The word marking list 236 is implemented as a header, followed by a list of time-stamped strings. The strings contain a start offset, a stop offset, and ASCII text. The start and stop offsets are byte offsets from the start of the speech sound data, written as 8-byte unsigned integers. The ASCII text consists of the word itself (e.g., "Ha"). The phoneme marking list 238 is implemented as a header, followed by a list of time-stamped strings. The strings contain a start offset, a stop offset, and ASCII text. The start and stop offsets are byte offsets from the start of the speech sound data, written as 8-byte unsigned integers. The ASCII text consists of a string of hex codes corresponding to individual IPA phonemes in the form of 0xhhhh, where each "h" denotes a single hex digit. For example, a string might be "0x00f0," which represents the English phoneme /ð/ (which is pronounced as the "th" in "they"). The lists could be implemented in other ways. For example, the file could be divided into frames, and the phoneme and word break data scattered throughout the file in the frames.

One benefit of implementing the audio chunk 234 in the same format as the speech sound data 206 is that the audio chunk 234 in the linguistically enhanced sound file 232 can be played with a sound player that can play the speech sound data 206. However, in some cases, it might be advantageous to use a different format.

Linguistic Information and Sound Editing Tool Features

Figure 6:
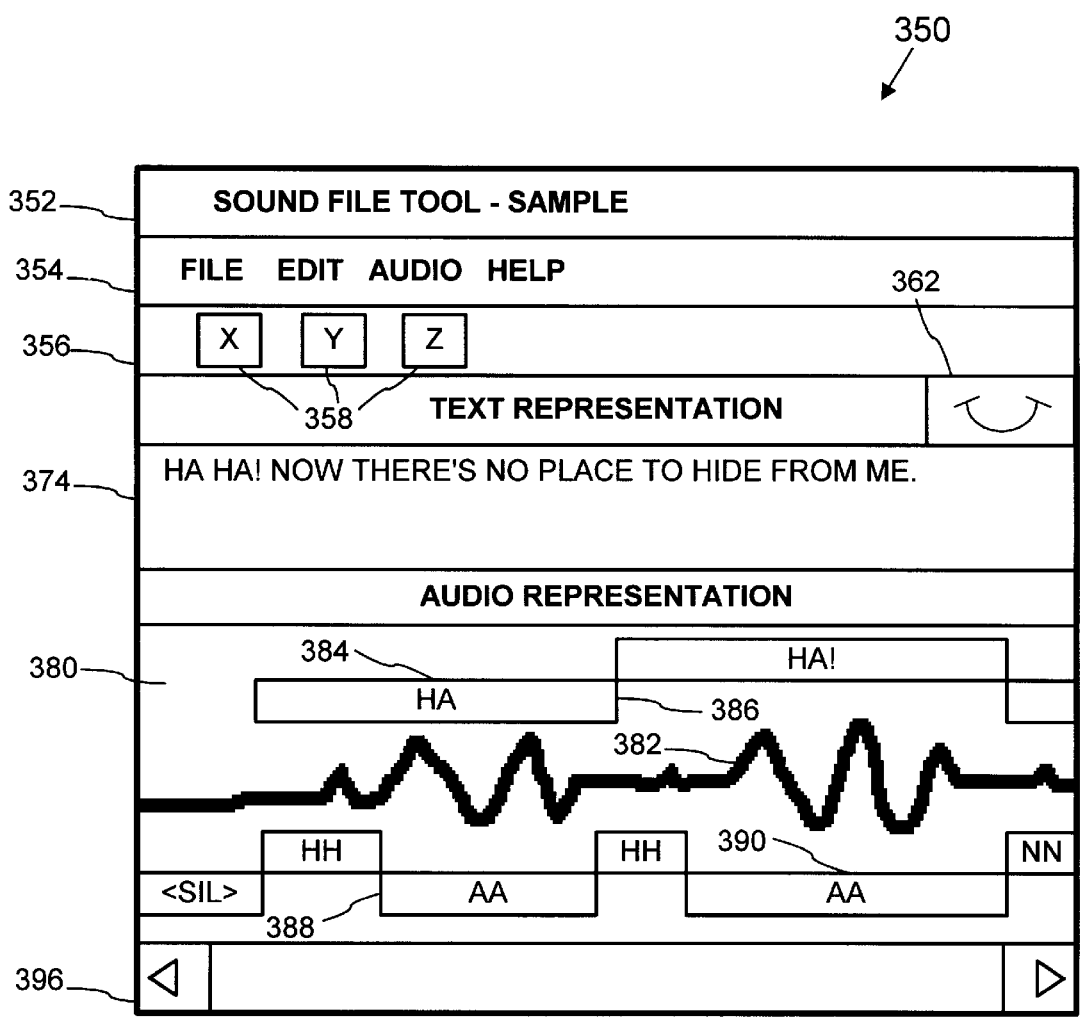
FIG. 6 is a view of a user interface window presented by the linguistic information and sound editing tool of FIG. 4.
Figure 7:
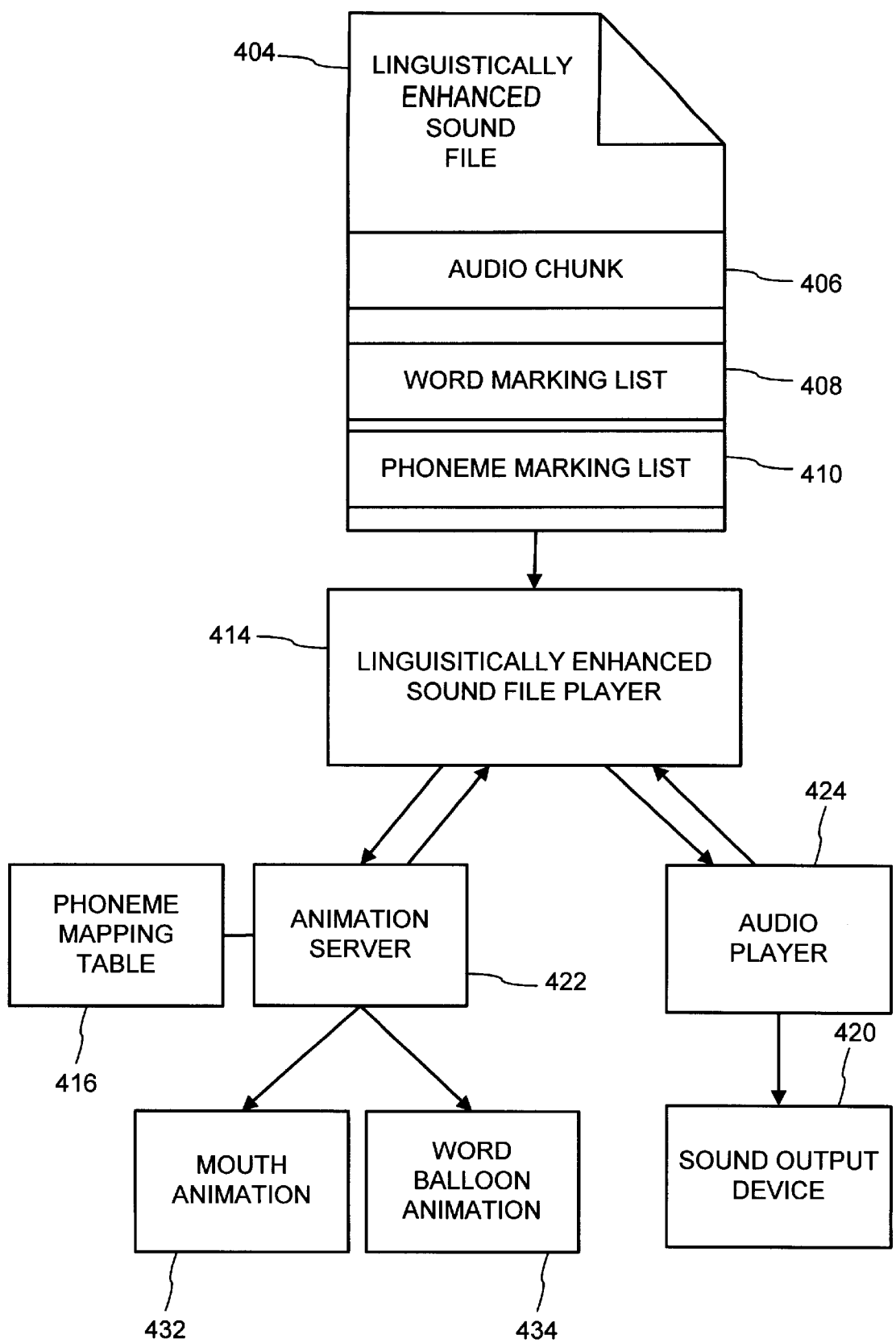
FIG. 7 is a block diagram showing a linguistically enhanced sound file player that executes on a computer system such as shown in FIG. 1.

FIG. 6 shows a view of the user interface presented by the linguistic information and sound information tool 208 shown in FIG. 4. The interface appears in a window 350 on a computer display, such as the monitor 47 (FIG. 1). The window 350 includes a title bar 352, a menu bar 354, a tool bar 356, and scrolling controls 396. The user interface presents various other features to enable the user to edit and preview linguistic and sound information.

As described in the above section on creating a linguistically enhanced sound file, the linguistic information and sound editing tool acquires text and speech sound data. The text is shown in a text representation pane 374, and the speech sound data is represented in an audio representation pane 380. A mouth animation can appear in a mouth animation preview pane 362 as explained below.

A word marker 384 and a phoneme marker 390 represent the linguistic information on the user interface. The markers indicate where a particular linguistic event (e.g. a word or phoneme) begins and ends with respect to the speech sound data 382 by their size and position. Within the marker appears a textual representation of the word or phoneme it represents. A "<SIL>" marker is used to represent silence, and other information about markers can be displayed, such as a hexadecimal code. In addition to the pictured markers, others could be used, such as a next slide marker indicating when the next slide of a slide show is to be shown.

The mouth animation can be previewed in the mouth animation preview pane 362 by selecting (e.g. clicking with some pointing device such as a mouse) on a graphical button 358 or an item (e.g., a command in a pull down menu) from the graphical menu bar 354. As a result, the system plays the sound data associated with the graphical representation 382 to a sound output device such as a speaker. Simultaneously, the system uses the linguistic information represented by the phoneme markers (e.g., the phoneme marker 390) with reference to the phoneme mapping table 222 (FIG. 4) to control presentation of the mouth shape in the mouth preview pane 362 during playback. Instead of playing the entire sequence of speech sound data, the user can select (e.g., highlight) a portion of the graphical representation 382 for preview.

In the exemplary implementation, the phoneme mapping table 222 (FIG. 4) contains IPA phoneme-desired mouth shape association pairs, stored internally as a height-balanced binary tree. The phoneme /ð/, which represents the /th/ sound in "that" or "they", for instance, is stored in the table 222 as the pair (0x0f0, MOUTHOPENWIDE2), which corresponds to an association between the Unicode character with hex index f0 (i.e., 240 decimal, representing the character "ð") and MOUTHOPENWIDE2, which represents a mouth shape which is approximately half-open. Similarly, the phoneme /u/, which represents to /oo/ in "hoot" or the /u/ sound in "rude" is represented by the pair (0x075, MOUTHOPENNARROW), which corresponds to an association between the phoneme 0x75 (i.e., 117 decimal, representing the character "u") and MOUTHOPENNARROW, which represents a fully rounded mouth, open only a little both vertically and horizontally.

The user can employ the interface to manipulate the linguistic information via the markers 384 and 390. For example, the user can change the size and position of a marker by dragging (i.e., manipulating with a pointing device such as a mouse) a marker edge 386 or 388. The change in the size and position of the marker is reflected in the linguistic information stored in the tool and is used during subsequent previews in the mouth animation pane 362. The user can select a save option to generate a linguistically enhanced sound file based on the graphical representation of sound data 382 and the phoneme and word break information represented by the markers.

Playing the Linguistically Enhanced Sound File

A system and method for playing a linguistically enhanced sound file 404 such as that described above is shown at FIGS. 7, 8A, 8B, and 8C. In the following example, the file 404 is played to generate sound output and synchronize the mouth and word balloon animation of a character with the sound output. As a result, it appears as if the character is speaking the words sounded from the computer speaker.

At step 450 (FIG. 8A), the animation server 422 and the linguistically enhanced sound file player 414 prepare to play linguistically enhanced sound files. As part of the preparation, the animation server 422 initializes an appropriate audio player 424 for output to the sound output device 420. In the illustrated embodiment, the audio player 424 is a software driver for presenting sound through a computer speaker such as the speaker 58 (FIG. 1). As described above in the discussion of the exemplary operating environment, alternatives for sound output may be used.

The animation server 422 then passes control over the audio player 424 to the linguistically enhanced sound file player 414, which sets up a callback mechanism between the linguistically enhanced sound file player 414 and the audio player 424. In addition, the animation server 422 sets up a call mechanism between itself and the linguistically enhanced sound file player 414. For each utterance, the animation server sends the linguistically enhanced sound file player 414 certain information, including a text string and a way to locate the linguistically enhanced sound file 404.

At step 452, the linguistically enhanced sound file player 414 retrieves an audio chunk 406 from the linguistically enhanced sound file 404. In the illustrated embodiment, the audio chunk 406 is a set of bytes in WAV format representing sampled human speech. Alternatively, the audio chunk 406 could be of any number of formats, such as the $\mu$-law, AIFF, or some other format. In addition, instead of actually retrieving the audio chunk 406 itself, an alternative implementation might store a pointer to the audio chunk 406.

At step 454, the linguistically enhanced sound file player 414 retrieves the word marking list 408 and the phoneme marking list 410 from the linguistically enhanced sound file 404. These lists are of the format described above for the word marking list 236 and the phoneme marking list 238 (FIG. 4) or some alternative format indicating a linguistic event and when within the audio chunk 406 the linguistic event occurs. In addition, instead of actually retrieving the lists, a pointer to a list might be stored.

Using the information in the word marking list 408 and the phoneme marking list 410, the linguistically enhanced sound file player 414 divides the audio chunk 406 into audio segments. The audio segments are bounded by phoneme and word boundaries as determined in the linguistically enhanced sound file creation process as described above and shown in FIGS. 4–6. In the illustrated embodiment, a segment is not split by any word or phoneme boundary. At step 456, the linguistically enhanced sound file player 414 decompresses the audio segment and sends it to the audio player 424 as part of an audio stream. In addition, the sound file player 414 sends the audio player 424 a bookmark indicating a phoneme or word boundary and how to process the boundary. The bookmark is sent as part of the audio stream to the audio player 424. Typically, a bookmark is sent between each segment, and more than one bookmark may be sent between two segments.

At step 458, the audio player 424 plays the audio segments in the audio stream to send a decompressed audio data stream to the sound output device 420. When it encounters a bookmark in the audio stream, the audio player 424 sends a notification back to the sound file player 414 using the callback mechanism set up during step 450. The notification includes information in the bookmark indicating how to process the notification.

At step 460, the sound file player 414, having received a notification from the audio player 424, sends a notification to an appropriate interface of the animation server, as determined by information from the bookmark (e.g., a next word interface or a phoneme interface). Under ideal circumstances, the audio player 424 sends each bookmark to sound file player 414 one at a time and in turn. However, due to hardware limitations of some computer systems, sometimes the audio player 424 does not immediately send a notification to the sound file player 414. As a result, the notifications are buffered. If buffered notifications have accumulated, the accumulated notifications and the current notification are sent to the animation server 422. In some cases, it may be desirable for the animation server 422 to skip a notification to maintain synchronicity with the sound output from the sound output device 420.

As the linguistically enhanced sound file player traverses the audio chunk 406, it reiterates steps 456–460 until it reaches the end of the audio chunk 406. At such time, other linguistically enhanced sound files 404 can be provided for additional utterances.

Figure 8A:
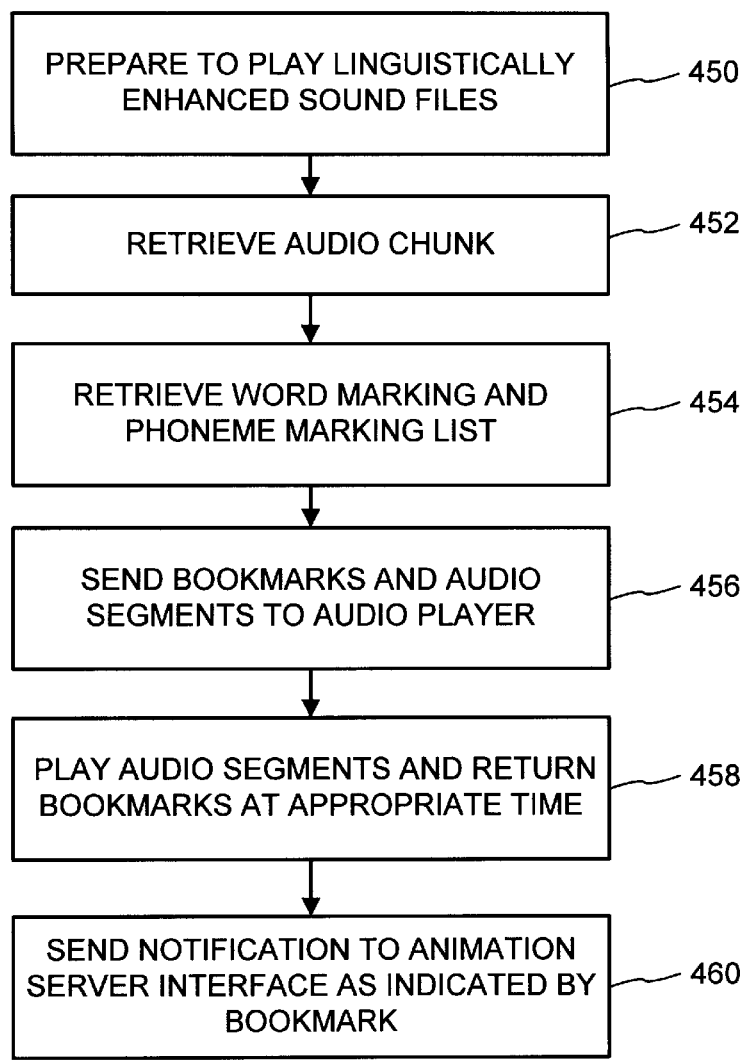
FIG. 8A is a flowchart of a method for playing a linguistically enhanced sound file carried out by the animation server, linguistically enhanced sound file player, and audio player of FIG. 7.
Figure 8B:
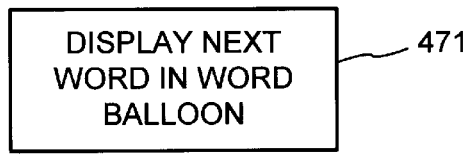
FIG. 8B is a flowchart of a method for processing next word notifications carried out by the animation server of FIG. 7.

When the interface of the animation server 422 for next word notifications receives a notification from the sound file player 414, it proceeds as shown in FIG. 8B. At step 472, the animation server 422 displays the next word in the utterance in the word balloon animation module 434.

Figure 8C:
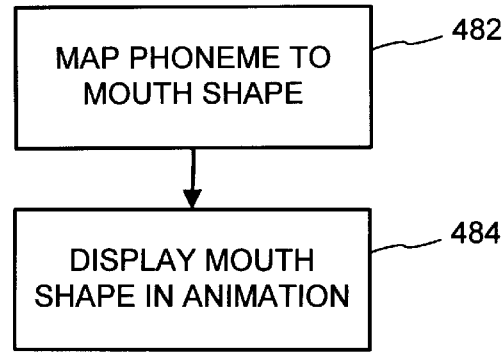
FIG. 8C is a flowchart of a method for processing phoneme notifications carried out by the animation server of FIG. 7.

When the interface of the animation server 422 for phoneme notifications receives a notification from the sound file player 414, it proceeds as shown in FIG. 8C. As part of the notification, a phoneme code is provided. At step 482, the animation server 422 maps the phoneme code to one of seven mouth shapes using the phoneme mapping table 416. An alternative implementation could be constructed without the phoneme mapping table 416, if, for example, the phoneme marking list 410 contained mouth shape values instead of phoneme values. Such an arrangement could be accomplished by performing the mapping while creating the linguistically enhanced sound file 404. Alternatively, the linguistically enhanced sound file player 414 could compute mouth shape values internally and send the mouth shape values to the animation server 422, rather than sending phoneme values. The animation server 422 then displays the mouth shape in the mouth animation module 432 at step 484.

In the illustrated embodiment, the notifications are processed immediately by the animation server. In an alternative embodiment, time information could be included in the notification, and the animation server 422 could use the time information to determine when to process the notifications. Yet another embodiment could send a list of notifications, each element of the list containing a start and stop time value and either a word or a phoneme value. In addition, start and stop time values might not be necessary in every instance. Instead, a single time (e.g., a start time) value might suffice.

An example implementation of the animation server 422 is Microsoft Agent, available from Microsoft Corporation. For more information about implementing an animation server, see copending patent application Ser. No. 08/858,648 entitled "Client Server Animation System for Managing Interactive User Interface Characters" by Tandy W. Trower, Mark Jeffry Weinberg, and John Wickens Lamb Merrill, filed on May 19, 1997, which is hereby incorporated by reference.

In the exemplary implementation, the animation server 422 accesses a phoneme mapping table 416 of the same structure as that described for the phoneme mapping table 222 (FIG. 4). Although the linguistic information and sound editing tool 208 (FIG. 4) and the animation server 422 could share a table, separate tables with the same contents are used in the illustrated embodiment.

The mouth animation module 432 typically provides a choice of seven different mouth shapes that can be displayed for a character. Typically, the mouth shapes are loaded from a mouth data file containing a set of bitmap images that can be customized for the particular character being presented. In addition, other sets of mouth shapes can be provided to reflect changes in the character's size, perspective, posture, or position on the display. To create the illusion of speech, the mouth animation module 432 draws a bitmap representing the mouth on top of the constructed animation frame representing the character at the (x, y) coordinates of the character's mouth location.

The word balloon animation module 434 places the word balloon in an appropriate position with respect to the animated character and displays an indicated word in the balloon upon being sent a message or notification. The module also manages the size and shape of the balloon and places words in the balloon. A feature allows the word balloon to be disabled, enabled with all the words appearing at once, or enabled with words appearing as they are spoken.

As a result of executing the steps indicated above, the animation elements generated by the word balloon and mouth animation modules 434 and 432 are synchronized with the audio chunk 406 as presented by the sound output device 420, presenting the illusion that an animated character is speaking. However, the features in the above description could be used for other purposes, such as controlling animation color or triggering some event in a computer presentation. For example, a window could be colored red upon detecting a word (e.g., "angry") or a slide show presentation could advanced to the next slide upon detecting a word (e.g., "next").

Programming Interfaces of the Animation System

In FIG. 9, an illustrated embodiment of an animation system 500 shows a linguistically enhanced sound file player 532 in conjunction with a text to speech (TTS) engine 534. This arrangement is presented for reducing the costs associated with prototyping an application 502. The application 502 can be inexpensively prototyped with the text to speech engine 534 because changes can easily be implemented by simply changing the text string 510 without recording human speech. Subsequently, an appropriate linguistically enhanced sound file 512 can be generated using professional vocal talent. A linguistically enhanced sound file player 532 and the sound file 512 can be swapped in for the text to speech engine 534 with very little change to the application 502. In this way, the final version of the application 502 presents a professional quality animation superior to that available with the synthetic voice generated by the text to speech engine 534. Since the text to speech engine 534 and the linguistically enhanced sound file player 532 interact with the animation server 504 and the audio player 572 in a compatible way, the linguistically enhanced sound file 512 can be added to the animation system 500 during the final stages of development with a minimum of changes to the application 502. Accordingly, an application can be developed without expending resources on generating and regenerating the linguistically enhanced sound file (e.g., employing vocal talent and sampling a human voice) until the final stages.

In the illustrated embodiment, the text to speech engine 534 is the Lernout and Hauspie Truvoice text to speech engine. However, some other engine could be used such as the AT&T FlexTalk engine.

When the system 500 is initialized, various callback mechanisms are put into place to facilitate communication between the components. Typically, the system 500 is set up in one of two alternative ways: as a synthetic speech generator, using the text to speech engine 534, or as a human speech player, using the linguistically enhanced sound file player 532. However, the system 500 could be set up as both simultaneously (e.g., for prototyping purposes). Under either arrangement, the interfaces 520 and 522 to the animation server 504 are used to provide the animation server 504 with notifications relating to word breaks and phonemes, respectively. Also, under either arrangement, the audio player 572 presents an interface 544, through which the linguistically enhanced sound file player 532 and the text to speech engine 534 can provide callbacks to their interfaces 540a and 540b. The interface 544 is also used to send audio segments and bookmarks to the audio player 572 under either arrangement.

For example, when the system 500 is initialized as a synthetic speech generator, the animation server 504 provides a callback to the phoneme interface 522 through an interface 524b to the text to speech engine 534. A callback to the notification interface 540b of the text to speech engine 534 is provided to the audio player 572 through the interface 544.

To specify an utterance under the synthetic speech generator arrangement, the application 502 specifies a text string 510 in a speak command (e.g., 'speak "This is a test."'). Using the interface 524b, the animation server 504 passes the string 510 (e.g., "This is a test.") to the text to speech engine 534 and a callback to its word break interface 520. The text to speech engine 534 generates appropriate synthetic speech output and bookmarks to interface 544 of the audio player 572, which plays the speech output to an output device. When the audio player 572 encounters a bookmark, the player 572 sends a notification back up the chain to the text to speech engine 534, which relays a notification to the animation server 504. Word break notifications are sent to the word break interface 520; phoneme notifications are sent to the phoneme interface 522. In this way, the character animation is synchronized with synthetic speech.

To specify an utterance under the human speech player arrangement, the application 502 specifies a text string 510 and a reference to a linguistically enhanced sound file 512 in a speak command (e.g., 'speak "This is a test.", test.lwv'). The reference could alternatively be something other than a file name (e.g., a uniform resource locator for specifying a file on the world wide web). The animation server 504 passes the string 510 (e.g., "This is a test."), the reference to the linguistically enhanced sound file 512, and a callback to its word break interface 520 to the linguistically enhanced sound file player 532 through interface 524a. In the illustrated embodiment, the text string 510 is used by the linguistically enhanced sound file player 532 to aid in determining word break notifications, but alternatively, the sound file player 532 could extract this information from the sound file 512. The linguistically enhanced sound file player 532 retrieves appropriate audio segments from the sound file 512 and generates bookmarks for the audio player 572. The audio segments and bookmarks are sent to the interface 544 of the audio player 572, which plays the audio to a sound output device. When the audio player 572 encounters a bookmark, it sends a notification back up the chain to the linguistically enhanced sound file player 532, which relays a notification to the animation server 504. Word break notifications are sent to the word break interface 520; phoneme notifications are sent to the phoneme interface 522.

The animation server 504 controls a character animation 508 and fields requests for animation services from an application 502. When a speak command is issued by the application 502, the animation server 504 handles the command as described above and subsequently receives notifications. The speak command can also specify whether a word balloon is used and whether words appear all at once or arc automatically paced to appear in the balloon as the character speaks them. Upon receiving notifications from the interfaces 520 and 522, the animation server performs appropriate actions in the character animation 508 (e.g., displaying a mouth shape in the animation 508 or displaying the next word in the word balloon of the animation 508.)

In the illustrated embodiment, the word break programming interface 520 is the ITTSBufNotifySink interface, and the phoneme programming interface 522 is the ITTSNotifySink Interface. In another embodiment, these two animation server interfaces 520 and 522 could be combined into one. The ITTSNotifySink interface contains a method "Visual" through which the identity of the current phoneme being spoken is transmitted to the animation server 504. The ITTSBufNotifySink contains a method "Bookmark" through which a next word notification is sent. Both the player 532 and the engine 534 use the Visual method of the ITTSNotifySink interface to report the currently active phoneme, and both use the Bookmark method to send next word notifications. In this way, the animation server 504 uses the word break and mouth shape information provided by the linguistically enhanced sound file player 532 or the text to speech engine 534 to synchronize the mouth movement presented in the character animation 508 with the synthetic or played speech. An additional interface 526 provides a means by which the linguistically enhanced sound file player 532 can be informed of the identity or contents of the linguistically enhanced sound file 512. In the embodiment of FIG. 9, the interface 526 consists of a single method which sets the name of the sound file to play; alternative implementations could provide either a pointer to memory or some other representation of the sound file 512, or some other method for accessing the file, such as a uniform resource locator (URL) specifying a document on the World Wide Web.

An advantage to the arrangement shown in FIG. 9 is that the notification interfaces 540a and 540b presented to the audio player 572 are the same or compatible. In addition, both the player 532 and the engine 534 can use the same interface 544 presented by the audio player 572. Thus, the same audio player 572, or a software copy, can be used with the linguistically enhanced sound file player 532 and the text to speech engine 534. In the illustrated embodiment, the player 532 and the engine 534 each have a copy of the software for the audio player 572, but the audio player 572 sends its output the same hardware device (e.g., a sound card).

Another advantage to the illustrated arrangement is that notifications are sent to the interfaces 520 and 522 of the animation server 504 by the sound file player 532 and the text to speech engine 534 in the same way. In addition, the programming interfaces 524a and 524b are the same or compatible. Under such an arrangement, the steps for playing an enhanced sound file 512 instead of generating synthetic speech are kept to a minimum: substituting the enhanced sound file player 532 for the text to speech engine 534 and specifying a reference to the sound file 512.

Further, from the perspective of the application 502, both the engine 534 and the player 532 operate in the same way. Thus, an application 502 can be prototyped using a synthetic voice generated by the text to speech engine 534, and the linguistically enhanced sound file player 532 is not required. Accordingly, the costs of employing professional vocal talent and the time required to sample a human voice are avoided during the prototyping process as revisions are made to the application 502.

In the final stages of development, a linguistically enhanced sound file 512 can be created by recording a human voice (e.g., professional vocal talent) and incorporated into the character animation 508 with a minimum of changes to the programming code in the application 502. In this way, the resulting application presents high quality animation while avoiding some of the development costs associated with using a human voice. In both cases, the character animation 508 presents an animation in which the character's mouth (and optionally, a word balloon) are synchronized with the speech sound output. However, the linguistically enhanced sound file 512 provides a superior animation with more realistic speech sound output.

In view of the many possible embodiments to which the principles of our invention may be applied, it should be recognized that the illustrated embodiments are only an example of the invention and should not be taken as a limitation on the scope of the invention. Rather, the scope of the invention is defined by the following claims. We therefore claim as our invention all that comes within the scope and spirit of these claims.

We claim:

1. A computer-implemented method for creating annotated sound data, the method comprising:

acquiring speech sound data comprising an utterance and a textual representation of the utterance of the speech sound data;

supplying a data structure specifying the contents of the textual representation of the utterance of the speech sound data to a speech recognition engine;

with the speech recognition engine, analyzing the speech sound data comprising the utterance and the data structure specifying the contents of the textual representation of the utterance of the speech sound data to determine linguistic event values indicative of linguistic events in the speech sound data comprising the utterance and time values indicative of when within the speech sound data comprising the utterance the linguistic events occur; and annotating the speech sound data comprising the utterance with the linguistic event values and the time values to create annotated sound data for synchronizing speech output with other computer output or processing.

2. A computer-readable medium having computer-executable instructions for creating annotated sound data by performing the following:

acquiring speech sound data comprising an utterance and a textual representation of the utterance of the speech sound data;

supplying a data structure specifying the contents of the textual representation of the utterance of the speech sound data to a speech recognition engine;

with the speech recognition engine, analyzing the speech sound data comprising the utterance and the data structure specifying the contents of the textual representation of the utterance of the speech sound data to determine linguistic event values indicative of linguistic events in the speech sound data comprising the utterance and time values indicative of when within the speech sound data comprising the utterance the linguistic events occur, and annotating the speech sound data comprising the utterance with the linguistic event values and the time values to create annotated sound data for synchronizing speech output with other computer output or processing.

3. The method of claim 1, wherein a linguistic event value is indicative of a spoken phoneme.

4. The method of claim 1, wherein a linguistic event value is indicative of a human mouth position.

5. The method of claim 1, wherein the linguistic event value is indicative of a spoken word boundary.

6. The method of claim 1, wherein a first linguistic event value is indicative of a spoken word boundary and a second linguistic event value is indicative of a spoken phoneme.

7. The method of claim 1 further comprising:

combining the speech sound data, the linguistic event values, and the time values to create a linguistically enhanced sound file.

8. The method of claim 1 wherein the sound file is created in a format that is the same as or compatible with the speech sound data, whereby the sound file can be played on a sound player that plays the speech sound data or compatible files.

9. The method of claim 1, further comprising:

playing the speech sound data from the annotated sound data to present sound output;

retrieving from the annotated sound data a linguistic event value and a time value; and performing an action in an animation indicative of the linguistic event at a time indicated by the time value, whereby the animation is synchronized with the linguistic event.

10. The method of claim 9, wherein the linguistic event value is indicative of a spoken phoneme and the action in the animation is the presentation of a mouth shape associated with the spoken phoneme.

11. The method of claim 9, wherein the linguistic event value is indicative of a spoken word and the action in the animation is a text presentation of the spoken word in a word balloon.

12. A computer-implemented method for synchronizing a word balloon animation of an animated character with speech sound data via linguistic enhancement data specifying spoken word boundaries, the method comprising:

playing the speech sound data to present sound output for the animated character;

retrieving from the linguistic enhancement data a linguistic event value indicative of a spoken word boundary, and a time value indicative of when within the speech sound data the spoken word boundary occurs; and in the word balloon animation of the animated character, presenting an additional word at the time indicated by the time value whereby the word balloon animation is synchronized with the spoken word boundary.

13. A computer-readable medium having computer-executable instructions for synchronizing a word balloon animation of an animated character with speech sound data via linguistic enhancement data specifying spoken word boundaries by performing the following:

playing the speech sound data to present sound output for the animated character;

retrieving from the linguistic enhancement data a linguistic event value indicative of a spoken word boundary and a time value indicative of when within the speech sound data the spoken word boundary occurs; and in the word balloon animation of the animated character, presenting an additional word at the time indicated by the time value whereby the word balloon animation is synchronized with the spoken word boundary.

14. A computer-implemented method for synchronizing mouth animation of a character with speech sound data comprising an utterance by employing a speech recognition engine to determine when phonemes occur within the utterance of the speech sound data, the method comprising:

providing a grammar based on a textual representation of the utterance of the speech sound data and the speech sound data to the speech recognition engine to produce an event list indicating when phonemes occur within the speech sound data, the event list comprising at least one phoneme event, the phoneme event comprising a phoneme type value indicative of a phoneme and a phoneme time value indicative of when within the utterance the phoneme occurs;

annotating the speech sound data with the event list to produce a linguistically enhanced sound file;

playing sound data from the linguistically enhanced sound file to produce sound output;

reading the event list from the linguistically enhanced sound file;

selecting a phoneme event in the list; and while playing the sound data, displaying a mouth shape associated with the phoneme indicated by the phoneme type value of the selected phoneme event at a time indicated by the phoneme time value of the selected phoneme event.

15. A computer-implemented method for synchronizing an animation of a character with speech sound data, the method comprising:

building a grammar from a text of the speech sound data;

providing the grammar and the speech sound data to a speech recognition engine to determine a phoneme value indicative of a member of the International Phonetic Alphabet occurring in the speech sound data, a phoneme time value indicative of when within the speech sound data the member occurs, and a word break time value indicative of when within the speech sound data a recognized word occurs;

annotating the speech sound data with the phoneme value, the phoneme time value, and the word break time value to create a linguistically enhanced sound file;

retrieving from the linguistically enhanced sound file the phoneme value, the phoneme time value, and the word break time value;

dividing the speech sound data from the linguistically enhanced sound file into a plurality of segments according to the phoneme time value and the word break time value;

sending the segments of the speech sound data from the linguistically enhanced sound file in an audio stream to an audio player to present sound output;

sending between two segments in the audio stream to the audio player a notification item indicative of a phoneme value notification;

sending between two segments in the audio stream to the audio player a notification item indicative of a word break;

presenting in the character animation a mouth shape associated with the phoneme value when the audio player encounters the phoneme value notification item in the audio stream, whereby the character animation is synchronized with the sound output; and presenting in the character animation a text presentation of a word in a word balloon of the character when the audio player encounters the word break notification item in the audio stream, whereby the character animation is synchronized with the sound output.

16. A computer-readable medium having computer-executable instructions for for synchronizing an animation of a character with speech sound data by perforrming the following:

building a grammar from a text of the speech sound data;

providing the grammar and the speech sound data to a speech recognition engine to determine a phoneme value indicative of a member of the International Phonetic Alphabet occurring in the speech sound data, a phoneme time value indicative of when within the speech sound data the member occurs, and a word break time value indicative of when within the speech sound data a recognized word occurs;

annotating the speech sound data with the phoneme value, the phoneme time value, and the word break time value to create a linguistically enhanced sound file;

retrieving from the linguistically enhanced sound file the phoneme value, the phoneme time value, and the word break time value;

dividing the speech sound data from the linguistically enhanced sound file into a plurality of segments according to the phoneme time value and the word break time value;

sending the segments of the speech sound data from the linguistically enhanced sound file in an audio stream to an audio player to present sound output;

sending between two segments in the audio stream to the audio player a notification item indicative of a phoneme value notification;

sending between two segments in the audio stream to the audio player a notification item indicative of a word break;

presenting in the character animation a mouth shape associated with the phoneme value when the audio player encounters the phoneme value notification item in the audio stream, whereby the character animation is synchronized with the sound output; and presenting in the character animation a text presentation of a word in a word balloon of the character when the audio player encounters the word break notification item in the audio stream. whereby the character animation is synchronized with the sound output.

17. A computer-implemented system for synchronizing a character animation with speech sound data comprising an utterance, the system comprising:

a speech recognition engine operable for receiving the speech sound data comprising the utterance and a list of one or more possibilities of the contents of the utterance of the speech sound data to provide a phoneme type value indicative of a phoneme occurring in the speech sound data and a phoneme time value indicative of when within the speech sound data the phoneme occurs;

a linguistic information and sound editing tool operable for acquiring the speech sound data comprising the utterance and a textual representation of the contents of the utterance of the speech sound data, the linguistic information and sound editing tool operable for providing the sound data comprising the utterance to the speech recognition engine and the textual representation of the contents of the utterance of the speech sound data to the speech recognition engine as the list of one or more possibilities of the contents of the utterance of the speech sound data and further operable for annotating the speech sound data with the phoneme type value provided by the speech recognition engine and the phoneme time value provided by the speech recognition engine to create a linguistically enhanced sound file;

a linguistically enhanced sound file player for playing the linguistically enhanced sound file to produce sound output from the sound data and operable to output the phoneme type value at a time indicated by the phoneme time value; and an animation server responsive to the phoneme type value output by the linguistically enhanced sound file player and operable to present in the character animation a mouth shape associated with the phoneme type value, whereby the character animation is synchronized with the sound output.

18. The system of claim 17 wherein, the linguistic information and sound editing tool presents the speech sound data as a graphical representation of sound waves;

the phoneme time value is represented by the location of a graphical marker on the graphical representation of sound waves; and the linguistic information and sound editing tool is operable for modifying the phoneme time value when an edge of the graphical marker is manipulated.

19. The system of claim 17 further comprising:

a text to speech engine operable to output synthetic speech and a phoneme type value at a time when a phoneme associated with the phoneme type value occurs in the synthetic speech;

wherein the animation server is responsive to the phoneme type value output by the text to speech engine to present a mouth shape associated with the phoneme type value; and wherein a programming interface presented by the animation server to the linguistically enhanced sound file player for receiving a phoneme type value and a programming interface presented by the animation server to the text to speech engine for receiving a phoneme type value are the same or compatible.

20. The system of claim 17 further comprising:

a text to speech engine operable to output synthetic speech and a phoneme type value at a time when a phoneme associated with the phoneme type value occurs in the synthetic speech;

wherein the animation server is responsive to the phoneme type value output by the text to speech engine to present a mouth shape associated with the phoneme type value; and wherein the linguistically enhanced sound file player and the text to speech engine send a phoneme type value to the animation server in the same way.

21. The system of claim 17 wherein, the speech recognition engine is further operable to provide a word break time value indicative of when within the speech sound data a next word in the text of the speech sound data occurs;

the linguistic information and sound editing tool is further operable to annotate the speech sound data with the word break time value provided by the speech recognition engine;

the linguistically enhanced sound file player is further operable to output a next word notification at a time indicated by the word break time value from the linguistically enhanced sound file; and the animation server is further responsive to the next word notification output by the linguistically enhanced sound file player to present in the animation a next word in the text of the speech sound data, whereby the animation is synchronized with the sound output.

22. The system of claim 21 wherein, the linguistic information and sound editing tool presents the speech sound data as a graphical representation of sound waves;

the word break time value is represented by the location of a graphical marker on the graphical representation of sound waves; and the linguistic information and sound editing tool is operable for modifying the word break time value when an edge of the graphical marker is manipulated.

23. A computer-readable medium having stored thereon a data structure for synchronizing speech sound data with a character animation, the data structure comprising at least two non-overlapping sections:

a first section comprising continuous speech sound data comprising digitized recorded speech for use with an animated character, wherein the first section is positioned to be played by a sound player following a format not having linguistic enhancement data; and a second section not overlapping the first section comprising continuous speech sound data, the second section comprising a phoneme marking list comprising a list of phoneme events, wherein a phoneme event is indicative of a phoneme type and indicative of a time when within the speech sound data the phoneme type occurs, whereby the phoneme event can be used by a player to synchronize mouth movement of the animated character with the speech sound data.

24. The computer-readable medium of claim 23 wherein the data structure further comprises:

a word marking list comprising a list of word events, wherein a word event is indicative of a word and indicative of a time when within the speech sound data the word occurs, whereby the word event can be used by a player to synchronize the appearance of words in a word balloon of the character with the speech sound data.

25. A computer-implemented system for synchronizing a character mouth animation with speech sound data comprising an utterance, the system comprising:

a speech recognition means operable for receiving the speech sound data comprising the utterance and a grammar of the utterance of the speech sound data to provide a phoneme type value indicative of a phoneme occurring in the speech sound data and a phoneme time value indicative of when within the speech sound data the phoneme occurs;

a linguistic information and sound editing means for acquiring the speech sound data and a textual representation of the utterance of the speech sound data, the linguistic information and sound editing means operable for providing the speech sound data to the speech recognition means and a grammar based on the textual representation of the utterance of the speech sound data to the speech recognition means as the grammar of the utterance and further operable for annotating the speech sound data with the phoneme type value provided by the speech recognition means and the phoneme time value provided by the speech recognition means to create a linguistically enhanced sound file;

a linguistically enhanced sound file playing means for playing the linguistically enhanced sound file to produce sound output from the speech sound data and operable to output a phoneme type value at a time indicated by the phoneme time value; and an animation means responsive to the phoneme type value output by the linguistically enhanced sound file playing means and operable to present in a character animation a mouth shape associated with the phoneme type value, whereby the character mouth animation is synchronized with the sound output.

26. A computer-implemented method for creating an annotated file for synchronizing the mouth animation of an animated character with sound data comprising a recorded spoken utterance via a speech recognition engine, wherein the speech recognition engine is operable to accept a data structure specifying what to look for in the recorded spoken utterance, the method comprising:

acquiring from a user a textual representation of the recorded spoken utterance;

based on the textual representation of the recorded spoken utterance, constructing a data structure instructing the speech recognition engine to look in the recorded spoken utterance for phonemes corresponding to the textual representation;

submitting to the speech recognition engine the sound data comprising the recorded spoken utterance and the data structure instructing the speech recognition engine to look in the recorded spoken utterance for phonemes corresponding to the textual representation;

activating the speech recognition engine to identify times at which phonemes occur within the recorded spoken utterance; and creating a file comprising the sound data and annotations indicating the times at which phonemes occur within the recorded spoken utterance.

27. The method of claim 26 wherein the activating comprises identifying, with the speech recognition engine, times at which word boundaries occur within the recorded spoken utterance; and the file comprises annotations indicating the times at which word boundaries occur within the recorded spoken utterance.

28. The method of claim 26 wherein the file comprising the sound data and annotations indicating the times at which phonemes occur within the recorded spoken utterance is of a format in which the sound data is separate from and not intermingled with the annotations indicating the times at which phonemes occur within the recorded spoken utterance.

29. The method of claim 26 wherein the sound data in the file is of the same format as the recorded spoken utterance.

30. The method of claim 26 wherein the activating instructs the speech recognition engine to recognize a single possibility: linguistic content corresponding to the textual representation of the recorded spoken utterance.

* * * * *

UNITED STATES PATENT AND TRADEMARK OFFICE
CERTIFICATE OF CORRECTION

PATENT NO. : 6,181,351 B1  Page 1 of 1
DATED : January 30, 2001
INVENTOR(S) : Merrill et al.

It is certified that error appears in the above-identified patent and that said Letters Patent is hereby corrected as shown below:

Title page,
References Cited
U.S. PATENT DOCUMENTS

"5,287,446   2/1994   William et al. ...................395/152"
should be,
-- 5,287,446   2/1994   Williams et al. ...................395/152--.

Column 18,
Line 19, "arc" should be -- are --.

Column 22, claim 16,
Line 18, "for for" should be -- for --.
Line 19, "performing" should be -- performing --.
Line 21, "thc" should be -- the --.
Line 59, "stream. whereby" should be -- stream, whereby --.

Signed and Sealed this

Twenty-seventh of November, 2001

Attest:

NICHOLAS P. GODICI
*Attesting Officer*   *Acting Director of the United States Patent and Trademark Office*